US011198591B2

(12) United States Patent
Palazzola et al.

(10) Patent No.: US 11,198,591 B2
(45) Date of Patent: Dec. 14, 2021

(54) REAL-TIME ROPE/CABLE/BELT SWAY MONITORING SYSTEM FOR ELEVATOR APPLICATION

(71) Applicant: thyssenkrupp Elevator Innovation and Operations GmbH, Essen (DE)

(72) Inventors: Michael Palazzola, Horn Lake, MS (US); Jie Xu, Brookhaven, GA (US); Stephen Allen, Middleton, TN (US); Peter Feldhusen, Collierville, TN (US); Frank Dudde, Collierville, TN (US); Alan Parker, Byhalia, MS (US)

(73) Assignee: TK Elevator Innovation and Operations GmbH, Duesseldorf (DE)

( * ) Notice: Subject to any disclaimer, the term of this patent is extended or adjusted under 35 U.S.C. 154(b) by 621 days.

(21) Appl. No.: 15/546,482

(22) PCT Filed: Jan. 28, 2016

(86) PCT No.: PCT/EP2016/051782
§ 371 (c)(1),
(2) Date: Jul. 26, 2017

(87) PCT Pub. No.: WO2016/120373
PCT Pub. Date: Aug. 4, 2016

(65) Prior Publication Data
US 2018/0016117 A1    Jan. 18, 2018

Related U.S. Application Data

(60) Provisional application No. 62/109,783, filed on Jan. 30, 2015.

(51) Int. Cl.
*B66B 7/12* (2006.01)
*B66B 5/02* (2006.01)
(Continued)

(52) U.S. Cl.
CPC .............. *B66B 7/1238* (2013.01); *B66B 5/02* (2013.01); *B66B 7/06* (2013.01); *G06T 7/246* (2017.01)

(58) Field of Classification Search
USPC ........................................................ 187/393
See application file for complete search history.

(56) References Cited

U.S. PATENT DOCUMENTS 7,117,981 B2 * 10/2006 Logan ................... B66B 7/1238
187/391
2013/0173206 A1 * 7/2013 Benosman ............... B66B 7/06
702/141
(Continued)

FOREIGN PATENT DOCUMENTS

CN    101811635 A    8/2010
CN    103003182 A    3/2013
(Continued)

OTHER PUBLICATIONS

International Search Report issued in PCT/EP2016/051782, dated May 26, 2016 (dated Jun. 2, 2016).

*Primary Examiner* — Christopher Uhlir
(74) *Attorney, Agent, or Firm* — William J. Cassin (57) ABSTRACT

Depth cameras may be placed within an elevator car hoistway to capture depth images of the elevator rope. 3D sensing software may be used to identify the rope within the depth images and assign tracking points to locations along the rope. Tracked images are saved over time and compared to prior tracked images to determine the movement of tracked points between images. Movement of tracked points may be used to determine the velocity, acceleration, frequency of wave motion, and other characteristics of the rope during a period of time. When measured characteristics exceed speci- (Continued)

fied thresholds, the system may take one or more actions to mitigate the undesirable behavior or provide notification of the undesirable behavior.

20 Claims, 6 Drawing Sheets

(51) Int. Cl.
*B66B 7/06* (2006.01)
*G06T 7/246* (2017.01)

(56) References Cited

U.S. PATENT DOCUMENTS

| | | | |
|---|---|---|---|
| 2014/0000985 A1* | 1/2014 | Fukui | B66B 5/0031 |
| | | | 187/247 |
| 2014/0240469 A1 | 8/2014 | Lee | |
| 2015/0293600 A1* | 10/2015 | Sears | G06F 3/017 |
| | | | 345/156 |

FOREIGN PATENT DOCUMENTS

| | | |
|---|---|---|
| CN | 103991767 A | 8/2014 |
| CN | 104276481 A | 1/2015 |
| CN | 104276526 A | 1/2015 |

\* cited by examiner

REAL-TIME ROPE/CABLE/BELT SWAY MONITORING SYSTEM FOR ELEVATOR APPLICATION

CROSS REFERENCE TO RELATED APPLICATIONS

This application is a U.S. National Stage Application of International Application No. PCT/EP2016/051782, filed Jan. 28, 2016, which claims priority to U.S. Provisional Patent Application Ser. No. 62/109,783, filed Jan. 30, 2015, entitled "Real-time Rope/Cable/Belt Sway Monitoring System for Elevator Application," the disclosures of both of which incorporated by reference herein in their entireties.

FIELD

The present disclosure relates to rope sway detection within an elevator system.

BACKGROUND

Some elevator systems rely on a rope and sheave system to raise and lower an elevator car within a hoistway. Such systems may have a sheave situated at the top of a hoistway, and one or more ropes looped around the sheave. One end of the ropes may be affixed to the top of an elevator car, while the other end of the ropes may be affixed to a counterweight. As the sheave rotates, the elevator car may ascend or descend within the hoistway. The elevator car and counterweight may also ride on guide rails to provide additional stability and emergency stop capabilities.

Guide rails may prevent sway of the elevator car and counterweight, but may not prevent undesirable swaying of the ropes within the hoistway. In some elevator systems, especially in tall buildings, the natural sway of the building as well as vibrations and movements of the elevator car can cause sway motions in the ropes that may be amplified over time. Such amplification can lead to the ropes developing a wave action of varying frequencies, which may cause undesirable stress to the ropes, objects which the ropes are affixed to, and objects within the hoistway struck by the ropes.

While a variety of devices, systems, and methods for detecting rope sway have been made and used, it is believed that no one prior to the inventor(s) has made or used the devices, systems, and methods as described herein.

SUMMARY

Disclosed herein are embodiments of a rope sway detection system. In some embodiments, the rope sway detection system comprises one or more depth sensing cameras arranged within an elevator hoistway and oriented so that an elevator rope is within a field of view. Accordingly, it is an object of the present disclosure to provide a sway detection system that may be flexibly and reliably installed within the hoistway.

In some embodiments, depth sensing devices can be in communication with an image processing system that is configured to receive and process a depth sensing camera dataset to determine the orientation of the elevator rope within three dimensional space. Accordingly, it is an object of the present disclosure to provide a sway detection system that may track the orientation of an elevator rope over a period of time.

In some embodiments, the image processing system is configured to compare one or more depth sensing camera datasets over a period of time to determine the displacement, acceleration, velocity, or other attributes of the elevator rope over time. Accordingly, it is an object of the present disclosure to provide a system that may estimate the motion of an elevator rope over a period of time.

In some embodiments, the image processing system is configured to perform one or more actions when a measured attribute exceeds a configured threshold. Accordingly, it is an object of the present disclosure to provide a system that may provide alerts to system operators or take preventative action when rope sway has reached undesirable levels.

Other aspects, features, and techniques within the scope of the present disclosure will become more apparent to those of ordinary skill in the art from the following description taken in conjunction with the drawings.

The drawings are not intended to be limiting in any way, and it is contemplated that various embodiments of the present disclosure may be carried out in a variety of other ways, including those not necessarily depicted in the drawings. The accompanying drawings incorporated in and forming a part of the specification illustrate several aspects, and together with the description serve to explain the principles of the present disclosure; it being understood, however, that the scope of the present disclosure is not limited to the precise arrangements shown.

DETAILED DESCRIPTION

The following description of certain embodiments should not be used to limit the scope of the present disclosure. Other examples, features, aspects, embodiments, and advantages will become apparent to those skilled in the art from the following description. As will be realized, various aspects of the present disclosure may take alternate forms, or have alternate or additional embodiments, without departing from the scope of the present disclosure. Accordingly, the drawings and descriptions should be regarded as illustrative in nature and not restrictive.

Figure 1:
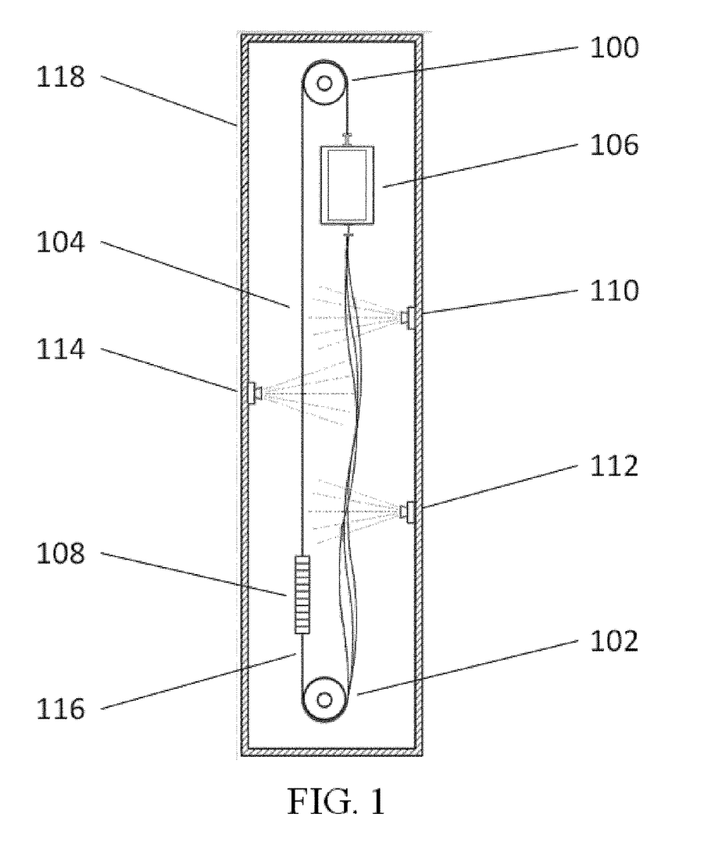
FIG. 1 depicts a front elevation view of an elevator system.

FIG. 1 depicts a front elevation view of one embodiment of an elevator system. A first sheave (100) may be located near the top of a hoistway (118). The first sheave (100) may be a traction sheave that is driven by an associated motor. A second sheave (102) may be located near the bottom of a hoistway (118). The second sheave (102) may be a deflector or compensation sheave configured to guide one or more elevator ropes. An elevator hoisting rope (104) may be connected at one end with a top part of an elevator car sling to which an elevator car is connected. In embodiments that use a counterweight (108), the other end of the elevator hoisting rope (104) may connect with a top portion of the counterweight (108). In embodiments with a counterweight (108), the elevator rope may include at least one compensating rope (116) that connects with a bottom portion of the counterweight (108). The compensating rope (116) extends from the counterweight (108) and wraps around the second sheave (102) and then a second end connects with the bottom of the car sling.

In embodiments without a counterweight, the elevator hoisting rope (104) may wrap the first sheave and then the other end of the elevator hoisting rope (104) may be connected with the bottom of the car sling. In embodiments without a counterweight (108), the elevator hoisting rope (104) wraps around the second sheave (102) before connecting with the bottom of the car sling. There is sufficient traction between the elevator hoisting rope (104) and the first sheave (100) such that as the motor drives the first sheave (100), the elevator hoisting rope (104) moves over the first sheave (100) thereby raising or lowering the elevator car depending on the direction of rotation of the first sheave (100). One or more depth sensing cameras (110, 112, 114) may be arranged within the hoistway (118) such that the elevator hoisting and/or compensating ropes (104, 116) can be within the field of view of the one or more depth sensing cameras (110, 112, 114). The first and second depth sensing cameras (110, 112) are arranged such that a swaying elevator hoisting and/or compensating rope (104, 116) will be imaged at various distances from the depth sensing cameras (110, 112) as it sways. While FIG. 1 shows three depth sensing cameras (110, 112, 114), different embodiments and different elevator systems may have any number of depth sensing cameras.

Figure 2:
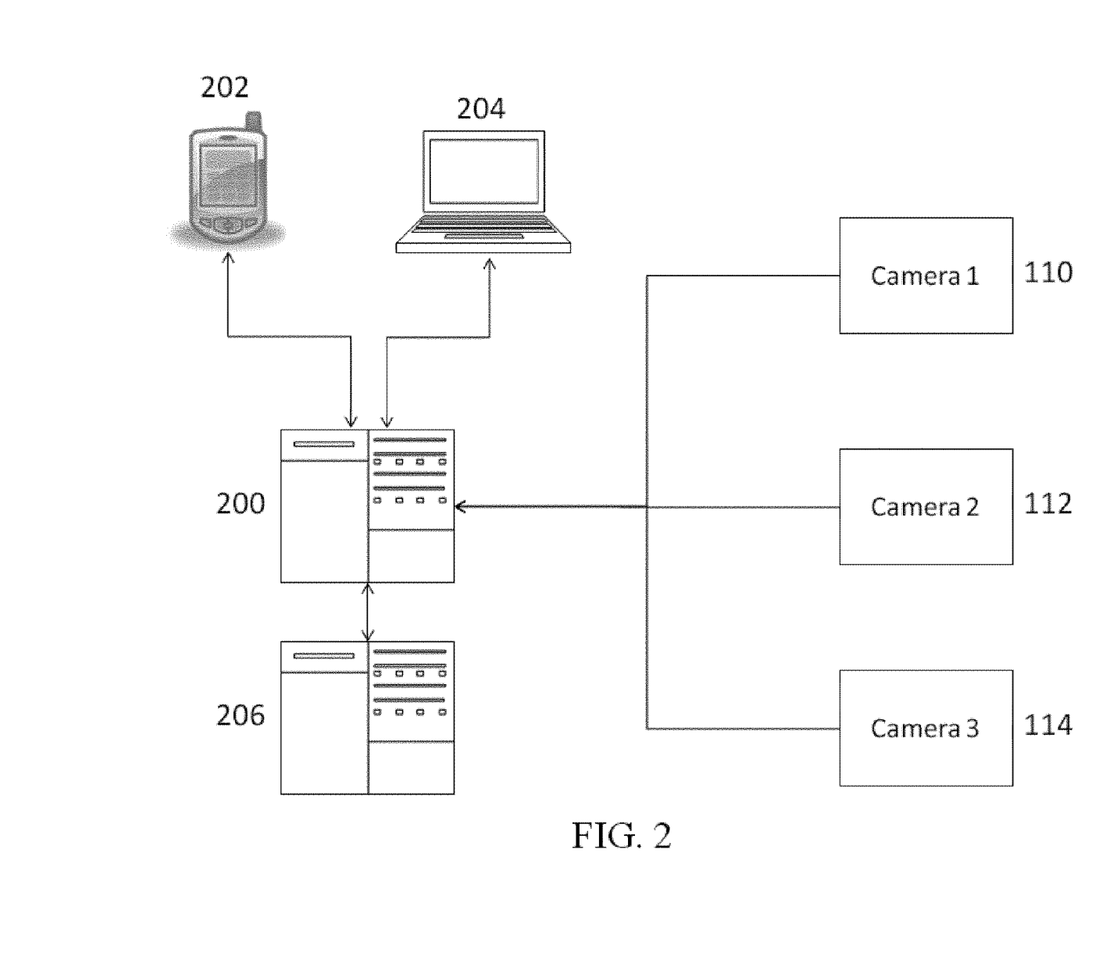
FIG. 2 depicts a schematic diagram of an elevator system.

FIG. 2 depicts a schematic diagram of one embodiment of an elevator system. An image processing system ("IPS") (200) may be one or more computers, components attached to a computer, or specialized pieces of hardware. The IPS (200) may be communicatively coupled with and receive output from one or more depth sensing cameras (110, 112, 114). Communication with depth sensing cameras may be achieved by, in various embodiments, using, USB, Wi-Fi, Bluetooth, HDMI, or other wired or wireless communication methods. The IPS (200) may save received output to a memory, physical disk, or other storage device. The IPS (200) may perform one or more actions relating to the received output, such as manipulating, filtering, converting, comparing, searching, or other processes.

In the embodiment of FIG. 2, the IPS (200) may be communicatively coupled with an elevator controller (206). The elevator controller (206) may communicate data and commands to an elevator car (106), sheave (100, 102) motor, braking system, or other components of the elevator system. The IPS (200) may communicate commands to an elevator controller (206) to cause such communication. In some embodiments, if an IPS (200) receives output from a depth sensing camera (110) indicating that a rope (e.g., a hoisting rope (104) or a compensating rope (116)) has exceeded safe limits of sway, the IPS (200) may communicate to the elevator controller (206) a command to remove the elevator car (106) from service until the sway may be addressed. In some embodiments, the IPS (200) and the elevator controller (206) may be the same piece of hardware, or components of a single system.

In the embodiment of FIG. 2, the IPS (200) may communicate with one or more mobile devices (202), computers (204), or other devices via, in various embodiments, e-mail, SMS, direct dial, Bluetooth, Wi-Fi, or other forms of communication. The IPS (200) may be configured to communicate a message to such a device based upon an occurrence. In some embodiments, if an IPS (200) receives output from a depth sensing camera (110) indicating that a rope has exceeded safe limits of sway, the IPS (200) may communicate information such as elevator system location, magnitude of sway, and other details relating to the swaying rope to one or more mobile devices (202) or computers (204). In this manner, a system operator or technician may be notified of undesirable sway so that it may be addressed.

Figure 3:
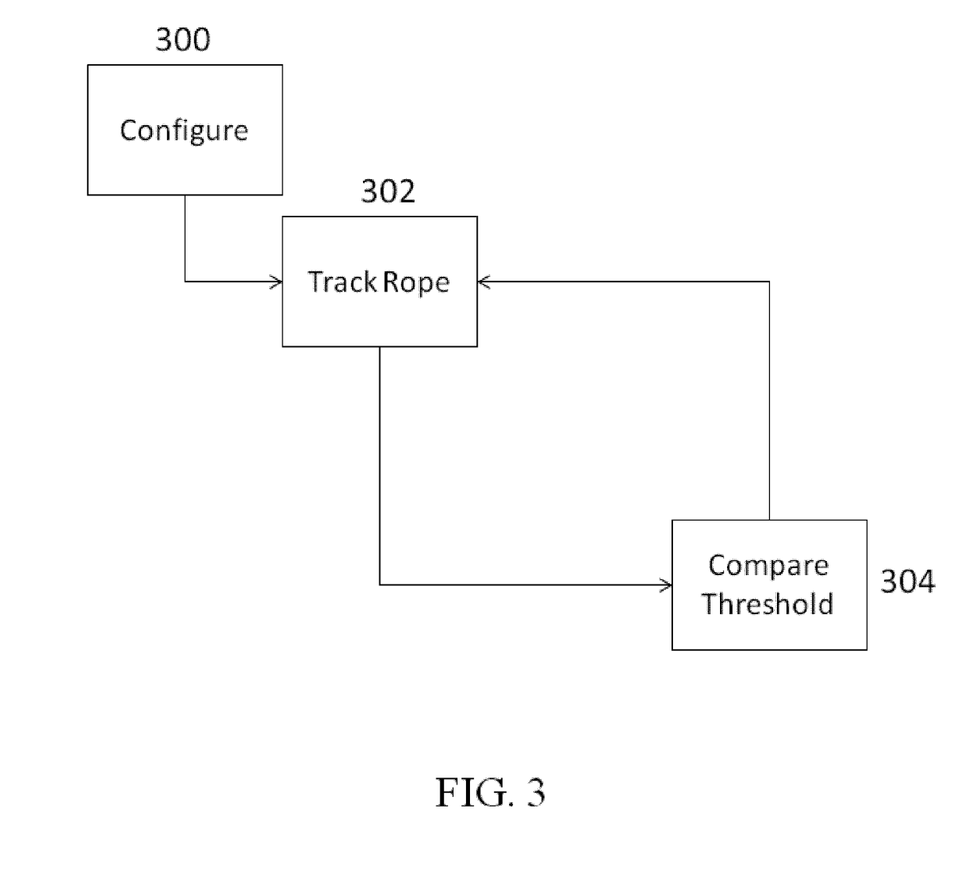
FIG. 3 is a flowchart illustrating a set of high level steps that may be performed to detect rope sway.

FIG. 3 is a flowchart illustrating one embodiment of a set of high level steps that may be performed to detect rope sway. One or more depth sensing cameras may be installed and configured (300) to capture depth information relating to an elevator rope (e.g., a hoisting rope (104) or a compensating rope (116)). Depth information from the elevator rope may be tracked (302) and provided to the IPS (200), where it may be processed into a representation of the rope's orientation in three dimensional space at a specific moment in time. A set of data comprising multiple representations of the rope's orientation over a period of time may be used to determine the rope's velocity, acceleration, and displacement due to sway. Determined values may be compared (304) to threshold values to determine whether any action may be taken by the IPS (200) based upon the determined values. Tracking (302) and comparing (304) may be repeated indefinitely once the system is running, as new orientation data will become available even as previous orientation data is processed.

Figure 4:
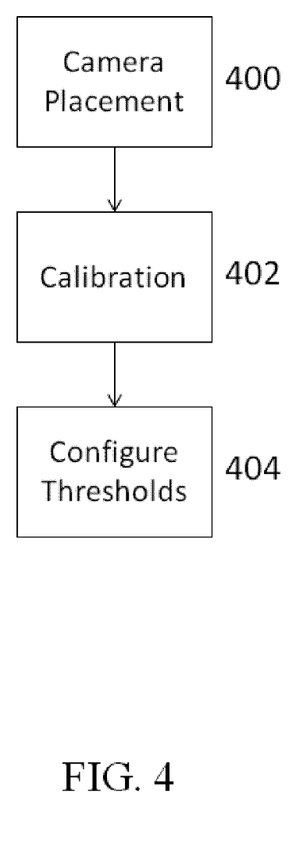
FIG. 4 is a flowchart illustrating a set of steps that may be performed to configure a system for detecting rope sway.

FIG. 4 is a flowchart illustrating one embodiment of a set of steps that may be performed to configure a system for detecting rope sway. Depth sensing cameras allow for flexibility in placement (400) within the hoistway (118). An elevator rope may be sensed by the depth sensing camera without the need for any special surfaces, markers, or devices to be affixed to the rope. A depth sensing camera may pulse a flash of light that reflects off objects within the camera's field of view. A sensor mounted on the camera captures the reflected light and calculates the distances to objects based upon the reflecting light's time of travel. This enables a depth sensing camera to capture information relating to the rope without any special modifications, markers, or trackers being affixed to the rope. Depth sensing cameras can also allow for multiple points along a rope to be tracked rather than a single point. Points may be tracked by using software to analyze reflected light and identifying the edges of an object, midpoints of an object, points where an object has a rotational axis, or other points. By tracking multiple points along a rope, a span of the rope may be identified and tracked. In some embodiments the span of rope tracked may exceed several meters depending upon a depth sensing camera's capabilities. Cameras may be placed (400) on an elevator car (106), on a fixed location within the hoistway (118) such as a wall, or on another moving structure within the hoistway such as the counterweight (108). Depth sensing cameras may be calibrated (402) to optimize performance in a particular scenario. Calibration (402) factors may vary by embodiment, but may include configuring the depth sensing camera to account for ambient light within the hoistway, the distance from the placement of the camera to the rope, the distance from the placement of the camera to a surface behind the rope, objects within the hoistway that may partially obstruct view of the rope, and other factors.

In the embodiment of FIG. 4, threshold values for attributes describing sway, such as displacement, velocity, or acceleration, may be configured (404) by saving the data to a memory accessible by the IPS. Threshold values may be used in comparisons (304) to measured sway values to indicate whether the measured sway of a rope is within an acceptable range. A configured threshold value for velocity may, in some embodiments, be 1 meter per second (m/s). If a depth sensing camera tracks a point on the rope and determines that its velocity is above 1 m/s, the threshold value would be exceeded, and the system may take action as a result. Configured values may vary based upon factors such as hoistway height and width, building height and width, local regulatory requirements, hardware tolerances or specifications relating to the rope or elevator car, or other factors.

Figure 5:
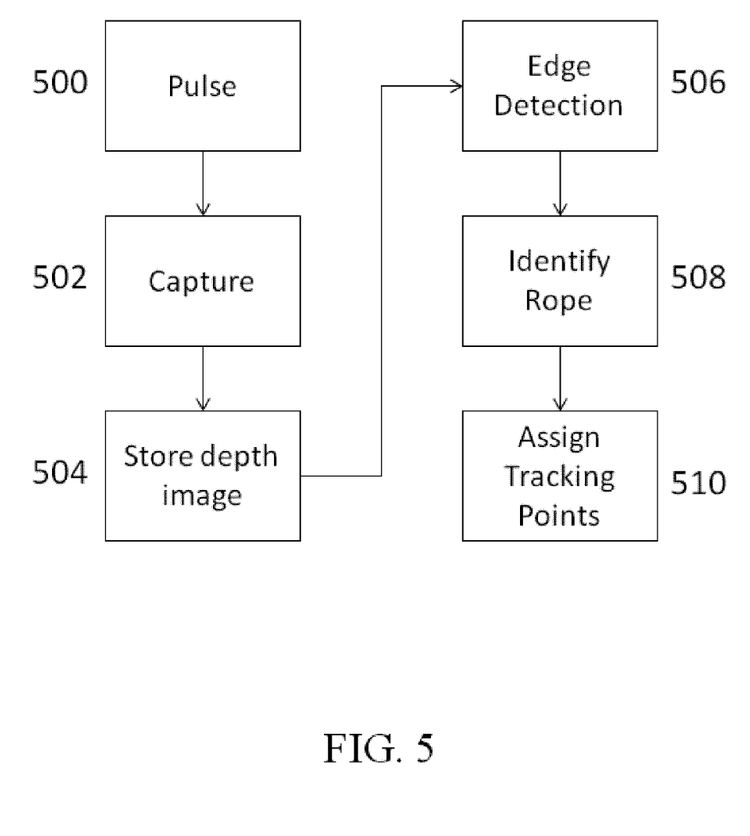
FIG. 5 is a flowchart illustrating a set of steps that a system may perform to capture and process depth camera data.

FIG. 5 is a flowchart illustrating one embodiment of a set of steps that a system may perform to capture and process depth camera data. The depth sensing cameras may pulse (500) to illuminate objects within the hoistway. Light reflected from objects during the pulses (500) may be captured (502) by a sensor of the depth sensing camera. The delay between a pulse (500) and capture (502) is used to determine the distance between the depth sensing camera and objects causing reflection. Distance data may be used to create a depth image where a range of colors may be used to distinguish objects that are further from the depth sensing camera from objects that are closer to the camera. Depth images created by the depth sensing camera may be stored (504) in a memory accessible to the IPS (200).

In the embodiment of FIG. 5, the IPS (200) may perform one or more edge detection (506) methods on depth images. Edge detection may be used on depth images to further distinguish the distances between near and far objects and may improve the chances of locating of one or more discrete objects within a depth image by identifying boundaries of objects. Edge detection methods used may include Prewitt, Canny, Sobel, Roberts, Laplacian, or others. In some embodiments, utilizing one method of edge detection, the edge of an object may be defined by identifying edge pixels with the steepest slopes. In a depth image, these edge pixels may create a boundary where an object that is near the depth sensing camera partially covers an object or surface that is far from the depth sensing camera. Identifying such a boundary may be achieved by determining the gradient vector J for an edge pixel by using a 2D intensity function using depth instead of intensity. The rope edge may have rapid slope variation in contrast to its background since the rope may be much closer to the camera than the background. High frequency noise may be removed by applying a low-pass filter to convolve the image with the Gaussian kernel function. Tables 1-3 below provide equations which can be used to support these features in certain embodiments.

TABLE 1

2D intensity equation for determining gradient vector of edge pixel $$J(x) = \nabla I(x) = \left(\frac{\partial I}{\partial x}, \frac{\partial I}{\partial y}\right)(x)$$

J—Gradient vector
x—horizontal axis
y—vertical axis
I—Intensity (depth)

TABLE 2

Low-pass filter $$J_\sigma(x) = \nabla[G_\sigma(x) * I(x)] = [\nabla G_\sigma](x) * I(x)$$

J—Gradient vector
X—horizontal axis
Y—vertical axis
I—Intensity (depth)
G—Gaussian kernel

TABLE 3

Gaussian kernel function $$\nabla G_\sigma(x) = \left(\frac{\partial G_\sigma}{\partial x}, \frac{\partial G_\sigma}{\partial y}\right)(x) - [-x - y]\frac{1}{\sigma^3}\exp\left(-\frac{x^2 + y^2}{2\sigma^2}\right)$$

J—Gradient vector
X—horizontal axis
Y—vertical axis
I—Intensity (depth)
G—Gaussian kernel In the embodiment of FIG. 5, once an edge has been identified (506), the IPS (200) may identify (508) the rope within the edge detected depth image. A 3D sensing framework, such as OpenNI, may be used to identify (508) the edge detected object boundary within the depth image that most resembles a rope. A 3D sensing framework may also be used to perform a connected component analysis, which may be able to identify two seemingly discrete objects within a depth image as actually being part of the same rope. Once the rope is identified (508), the IPS (200) may use the 3D sensing framework to assign (510) one or more tracking points to the rope. Tracking points may be used as a comparison point between two depth images to determine the change in the rope's orientation over time. In some embodiments, by comparing a first depth image, occurring at 0 seconds, to a second depth image, occurring one tenth of a second later at 0.1 seconds, the IPS (200) may determine whether one or more of the tracking points have changed in location during that time period as well as the extent of the change.

Figure 6:
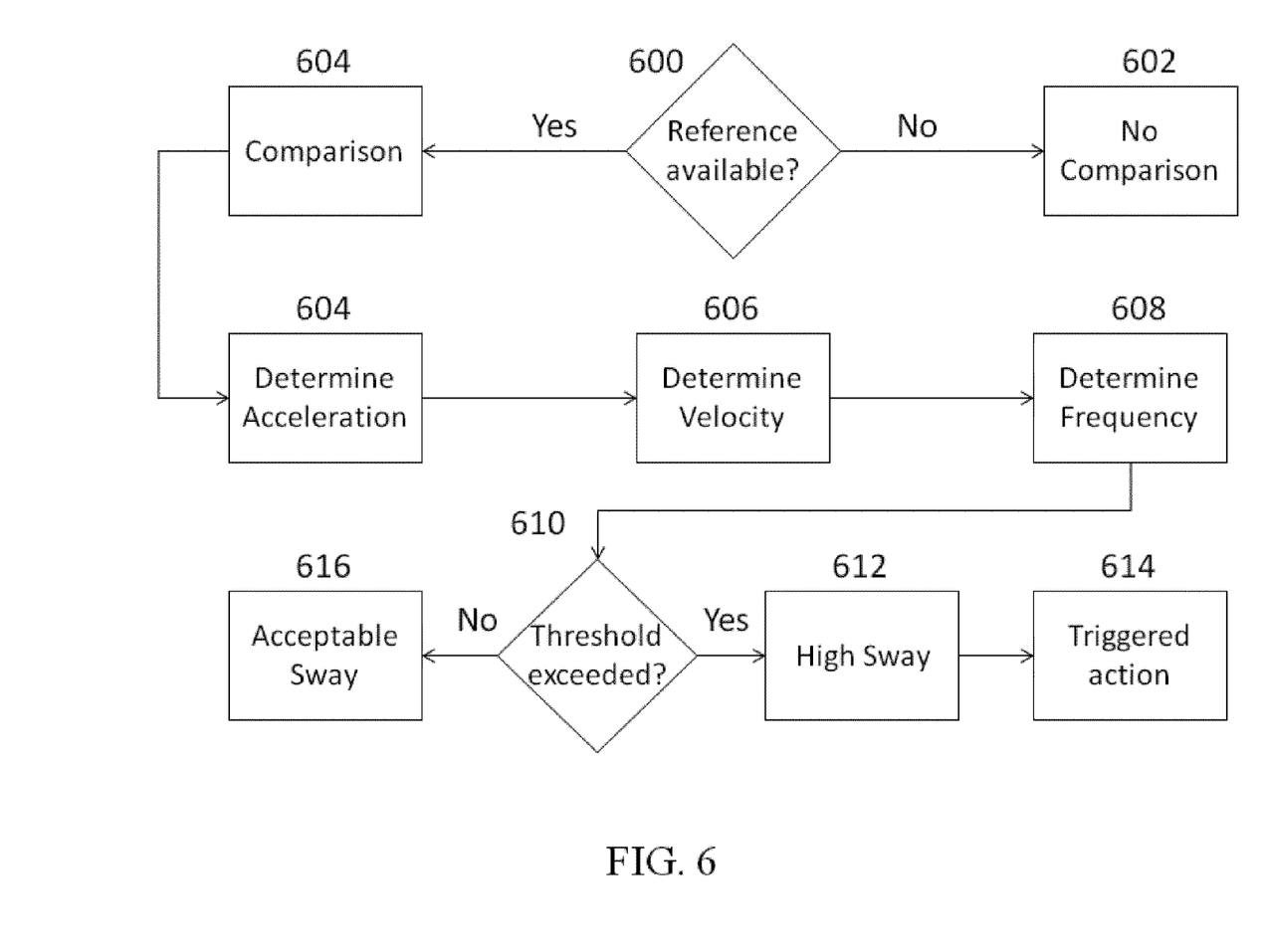
FIG. 6 is a flowchart illustrating a set of steps that a system may perform to generate alerts based upon depth camera data.

FIG. 6 is a flowchart illustrating one embodiment of a set of steps that a system may perform to generate alerts based upon depth camera data. As the IPS (200) stores (504) depth images and assigns tracking points (510), comparisons (604) may be made between a prior occurring tracked image and a later occurring tracked image. If no prior occurring tracked image is available to use as a reference (600), which may occur when the IPS first begins to gather tracked images, there may be no comparison (602). Once the IPS is able to save one or more tracked images, comparisons (604) may occur. A comparison (604) between the tracking points of a prior tracked image and a later tracked image may be used to determine the motion of the rope during the time period occurring between the images. In some embodiments, if a tracked image of a rope has a point P1 near the top of the rope within the image, point P2 near the midpoint of the rope within the image, and point P3 near the bottom of the rope within the image, a comparison may be made between P2's location within three dimensional space in a first image, I1, and a second image, I2, where I2 occurred one tenth of a second later. In such an embodiment, the IPS (200) may compare P2 of I1 and P2 of I2, and determine that P2 has moved 0.1 meters along a horizontal axis in a time period of one tenth of a second.

In the embodiment of FIG. 6, based upon the movement of a tracked point during a time period, the IPS (200) may determine acceleration, (604), velocity (606), frequency (608), or other characteristics. Velocity (606) may be determined by adjusting the measured distance of movement to a one second interval. In the embodiment above, a 0.1 meter movement along the horizontal axis over a 0.1 second time period would be adjusted to a velocity of 1 m/s. Acceleration may be determined (604) by first calculating velocity, and then comparing to the velocity of the previous image to determine the change in velocity between images. In the embodiment above, if I1 had a velocity of 0 m/s, it may be determined that the acceleration of P2 at the time of I2 is 1 m/s squared. Frequency may be determined (608) by a comparison of P1, P2, and P3 in I1, versus the same set of points in I2, to determine if their movement between I1 and I2 exhibits the characteristics of a wave frequency.

In the embodiment of FIG. 6, for each characteristic determined the IPS (200) may compare to a configured threshold value (610). If a characteristic is within an acceptable range as indicated by the threshold comparison, the sway of the rope may be acceptable (616). If a characteristic exceeds or does not fall within the acceptable range as indicated by the threshold comparison, it may indicate high sway (612) and may trigger one or more actions (614). If, upon comparison of I2 it is determined that P2 has a velocity of 1 m/s, and the configured velocity threshold for the elevator system is 1.5 m/s, the sway may be within acceptable boundaries (616). If however the velocity is measured as 1.6 m/s, high sway (612) would be detected and the IPS (200) may take action. Actions taken may include, in various embodiments, communication with the elevator controller (206) to remove a car from service or deploy a sway countermeasure, communication with a mobile device (202) via SMS, e-mail, or phone call, or communication with a computing device (204) via a web application, standalone application, or other application.

The following embodiments relate to various non-exhaustive ways in which the teachings herein may be combined or applied. It should be understood that the following embodiments are not intended to restrict the coverage of any claims that may be presented at any time in this document or in subsequent filings based on this document. No disclaimer is intended. The following embodiments are being provided for nothing more than merely illustrative purposes. It is contemplated that the various teachings herein may be arranged and applied in numerous other ways. It is also contemplated that some embodiments may omit certain features referred to in the below embodiments. Therefore, none of the aspects or features referred to below should be deemed critical unless otherwise explicitly indicated as such at a later date by the inventors or by a successor in interest to the inventors. If any claims are presented in this document or in subsequent filings related to this document that include additional features beyond those referred to below, those additional features shall not be presumed to have been added for any reason relating to patentability.

Embodiment 1

An apparatus comprising: an elevator hoistway; an elevator rope situated within the elevator hoistway; an elevator car attached to the elevator rope; a motor operable to raise and lower the elevator car within the elevator hoistway; an imaging device situated within the elevator hoistway, wherein the elevator rope is within the field of view of the imaging device, and wherein the imaging device is capable of capturing three dimensional depictions of objects within its field of view; an image processing device configured to receive imaging data from the imaging device; and a controller in communication with the image processing device, the controller configured to operate the motor; wherein the image processing device is configured to: determine a reference position of the elevator rope at a reference time based upon a reference set of imaging data; determine a current position of the elevator rope at a current time based upon a current set of imaging data; determine a change in position of the elevator rope between the reference position and the current position; and based upon the change of position and the elapsed time between the reference time and the current time, determine a set of motion characteristics for the elevator rope; and wherein the controller is configured to perform one or more motion countermeasures based upon the set of motion characteristics.

Embodiment 2

The apparatus of Embodiment 1, wherein the set of motion characteristics comprise: rope acceleration; rope velocity; and rope frequency; and wherein the controller is further configured to determine rope sway based upon one or more of the set of motion characteristics.

Embodiment 3

The apparatus of Embodiment 2, wherein the controller is further configured to perform the one or more motion countermeasures when the controller determines that rope sway exceeds a rope sway threshold.

Embodiment 4

The apparatus of Embodiment 3, wherein performing a countermeasure of the one or more motion countermeasures causes the controller to prevent the motor from operating until rope sway does not exceed the rope sway threshold.

Embodiment 5

The apparatus of any one or more of Embodiments 1 through 4, wherein performing a countermeasure of the one or more motion countermeasures causes the controller to transmit an electronic signal to a remote device indicating that rope sway exceeds the rope sway threshold.

Embodiment 6

The apparatus of any one or more of Embodiments 1 through 5, wherein the imaging device is attached to an attachment point, the attachment point selected from the group consisting of the elevator car and an interior wall of the elevator hoistway.

Embodiment 7

The apparatus of any one or more of Embodiments 1 through 6, wherein the imaging device comprises a plurality of imaging devices, and wherein each imaging device of the plurality of imaging devices is placed at a different height within the elevator hoistway.

Embodiment 8

The apparatus of any one or more of Embodiments 1 through 7, wherein the image processing device is configured to determine the reference position and the current position by executing a set of instructions operable to cause the image processing device to: cause the imaging device to pulse and illuminate objects within its field of view; identify a set of discrete objects illuminated by the pulse using edge detection; identify a visualized rope from the set of discrete objects; and assign one or more tracking points to the visualized rope, wherein each tracking point indicates the position of a point of the visualized rope in three dimensional space.

Embodiment 9

The apparatus of any one or more of Embodiments 1 through 8, wherein the imaging device generates imaging data by projecting a pulse of light that illuminates the elevator rope and capturing reflections of the pulse of light from the elevator rope.

Embodiment 10

The apparatus of any one or more of Embodiments 1 through 9, wherein the one or more motion countermeasures comprise at least two of: a modification of the operation of the motor; a generation of a notification to a remote device describing an aspect of the set of motion characteristics; a deployment of a rope sway dampener device, wherein the rope sway dampener device is in contact with the elevator rope; and a modification of the operation of a sheave, wherein the sheave is in contact with the elevator rope.

Embodiment 11

The apparatus of Embodiment 10, wherein the controller is further configured to, based upon a subsequent set of motion characteristics, execute instructions causing one or more of: a reversal of the modification of the operation of the motor; a generation of an additional notification to the remote device; a withdrawal of the rope sway dampener device; or a reversal of the modification of the operation of the sheave.

Embodiment 12

A method comprising the steps: receiving a reference set of imaging data from an imaging device, the reference set of imaging data describing a reference position of an elevator rope within an elevator hoistway at a reference time; receiving a current set of imaging data from the imaging device, the current set of imaging data describing a current position of the elevator rope within an elevator hoistway at a current time; determining a change of position between the reference position between the reference position and the current position; determining a set of motion characteristics based upon the change of position and the elapsed time between the reference time and the current time; and performing a motion countermeasure based upon the set of motion characteristics.

Embodiment 13

The method of Embodiment 12, wherein the set of motion characteristics comprise: rope acceleration; rope velocity; and rope frequency; and further comprising the step of determining rope sway based upon one or more of the set of motion characteristics.

Embodiment 14

The method of Embodiment 13, wherein the motion countermeasure is performed when rope sway exceeds a rope sway threshold.

Embodiment 15

The method of Embodiment 14, wherein the motion countermeasure comprises one or more of removing an elevator car from service, wherein the elevator car is attached to the elevator rope; transmitting a notification to a remote device, the notification describing the motion characteristics; and deploying a rope sway dampener device, wherein the rope sway dampener device is in contact with the elevator rope.

Embodiment 16

The method of Embodiment 15, further comprising the step of, when a subsequent set of motion characteristics indicates that rope sway does not exceed the rope sway threshold, performing one or more of: returning the elevator car to service; transmitting a further notification to a remote device, the notification describing the subsequent set of motion characteristics; and withdrawing the rope sway dampener device.

Embodiment 17

The method of any one or more of Embodiments 12 through 16, further comprising the step of attaching the imaging device to the elevator car.

Embodiment 18

The method of any one or more of Embodiments 12 through 17, further comprising the step of attaching the imaging device to an interior wall of the elevator hoistway.

Embodiment 19

The method of any one or more of Embodiments 12 through 18, wherein the imaging device is a camera capable of capturing three dimensional depictions of objects within its field of view.

Embodiment 20

An apparatus comprising: an elevator hoistway; a first sheave situated in the upper half of the elevator hoistway; a second sheave situated in the lower half of the elevator hoistway; an elevator rope wrapped around the first sheave and the second sheave, the elevator rope comprising a first end and a second end, the first end attached to the top of an elevator car and the second end attached to the bottom of the elevator car; a motor operable to raise or lower the elevator car within the elevator hoistway; an imaging device situated within the elevator hoistway, wherein the elevator rope is within the field of view of the imaging device, and wherein the imaging device is capable of capturing three dimensional depictions of objects within its field of view; an image processing device configured to receive imaging data from the imaging device; and a controller in communication with the image processing device, the controller configured to operate the motor; wherein the image processing device is configured to: determine a reference position of the elevator rope at a reference time based upon a reference set of imaging data; determine a current position of the elevator rope at a current time based upon a current set of imaging data; determine a change in position of the elevator rope between the reference position and the current position; and based upon the change of position and the elapsed time between the reference time and the current time, determine a rope sway measurement; and wherein the controller is configured to, when the rope sway measurement exceeds a rope sway threshold, transmit a notification to a remote device, wherein the notification describes the rope sway measurement.

It should be understood that any one or more of the teachings, expressions, embodiments, examples, etc. disclosed herein may be combined with any one or more of the other teachings, expressions, embodiments, examples, etc. that are disclosed herein. The teachings, expressions, embodiments, examples, etc. disclosed herein should therefore not be viewed in isolation relative to each other. Various suitable ways in which numerous aspects of the present disclosure may be combined will be readily apparent to those of ordinary skill in the art in view of the teachings disclosed herein. Such modifications and variations are intended to be included within the scope of both the present disclosure and the claims.

Having shown and described various embodiments of the present disclosure, further adaptations of the methods and systems described herein may be accomplished by appropriate modifications by one of ordinary skill in the art without departing from the scope of the present disclosure. Several of such potential modifications have been mentioned, and others will be apparent to those skilled in the art. For instance, examples, embodiments, geometries, materials, dimensions, ratios, steps, and the like discussed above are illustrative and are not required. Accordingly, the scope of the present disclosure should be considered in terms of the following claims and is understood not to be limited to the details of structure and operation shown and described in the specification and drawings.

What is claimed is:

1. A system for detecting and reducing undesirable sway of an elevator rope in an elevator hoistway, comprising:
   an elevator hoistway;
   an elevator rope disposed in the elevator hoistway;
   an elevator car disposed within the elevator hoistway and coupled to the elevator rope;
   a motor in operative communication with the elevator rope that is operable to raise and lower the elevator car within the elevator hoistway;
   an imaging device disposed in the elevator hoistway such that an orientation of the elevator rope is tracked over a period of time within the field of view of the imaging device in real-time, the imaging device being configured to capture three dimensional depictions of objects within its field of view;
   an image processing device in communication with the imaging device and configured to:
      repeatedly receive a current set of imaging data from the imaging device, which current set of imaging data includes a current position of a discrete point on the elevator rope at a current time,
      use a prior-received set of imaging data from the imaging device as a reference set of imaging data, to determine a prior occurring reference position of the discrete point on the elevator rope at a prior occurring reference time,
      repeatedly compare the current set of imaging data to the prior-received set of imaging data to determine a change in position of the discrete point on the elevator rope between the reference position and the current position during an amount of elapsed time occurring between the reference time and the current time, so as to repeatedly track motion of the discrete point on the elevator rope in real-time, and
      repeatedly determine a set of motion characteristics that define a real-time motion of the elevator rope, based upon the change of position and the amount of elapsed time; and
   a controller in communication with the image processing device, the controller configured to operate the motor and to initiate performance of a motion countermeasure for the elevator rope based on a determination that one or more motion characteristics in the determined set of motion characteristics exceed a threshold value.

2. The apparatus of claim 1, wherein the set of motion characteristics comprise:
   rope acceleration;
   rope velocity; and
   rope frequency; and
   wherein the controller is further configured to determine rope sway based upon one or more characteristics from the set of motion characteristics.

3. The apparatus of claim 1, wherein the controller is further configured to initiate the performance of the motion countermeasure when the controller determines that rope sway exceeds a rope sway threshold.

4. The apparatus of claim 3, wherein the motion countermeasure includes preventing the motor from operating until rope sway does not exceed the rope sway threshold.

5. The apparatus of claim 3, wherein the motion countermeasure includes transmitting an electronic signal to a remote device indicating that rope sway exceeds the rope sway threshold.

6. The apparatus of claim 1, wherein the imaging device is attached to a component selected from the group consisting of the elevator car and an interior wall of the elevator hoistway.

7. The apparatus of claim 1, wherein the imaging device comprises a plurality of imaging devices, wherein the image processing device is configured to continuously receive a separate current set of imaging data from each of the plurality of imaging devices, and wherein each imaging device of the plurality of imaging devices is placed at a different height within the elevator hoistway and adapted to provide imaging data for a different span of the elevator rope.

8. The apparatus of claim 1, wherein the current position of the discreet point on the elevator rope at the current time is determined by executing a set of instructions operable to cause the image processing device to:
   pulse and illuminate objects within its field of view;
   identify a set of discrete objects illuminated by the pulse using edge detection;
   identify a visualized rope from the set of discrete objects;
   assign one or more tracking points to the visualized rope, wherein each tracking point indicates a position of a point of the visualized rope in three dimensional space; and
   define a current position of the elevator rope based on the one or more tracking points.

9. The apparatus of claim 1, wherein the imaging device is configured to generate imaging data by:
projecting a pulse of light that illuminates the elevator rope; and
capturing reflections of the pulse of light from the elevator rope.

10. The apparatus of claim 1, wherein the motion countermeasure comprises at least two of:
a modification of the operation of the motor;
a generation of a notification to a remote device describing an aspect of the set of motion characteristics;
a deployment of a rope sway dampener device that contacts the elevator rope; and
a modification of the operation of a sheave, wherein the sheave is in contact with the elevator rope.

11. The apparatus of claim 10, wherein the controller is further configured to, based upon a subsequent set of motion characteristics, execute instructions causing one or more of:
a reversal of the modification of the operation of the motor;
a generation of an additional notification to the remote device;
a withdrawal of the rope sway dampener device; or
a reversal of the modification of the operation of the sheave.

12. A method of detecting and reducing undesirable sway of an elevator rope in an elevator hoistway, comprising:
receiving, in an image processing device, a current set of imaging data from an imaging device, which current set of imaging data describes a current position of a discrete point on the elevator rope within the elevator hoistway at a current time;
using a prior set of imaging data, received in the image processing device from the imaging device prior to the current set of imaging data, as a reference set of imaging data to describe a prior occurring reference position of the discrete point on the elevator rope within the elevator hoistway at a prior occurring reference time;
comparing the current set of imaging data to the prior-received set of imaging data to determine in the image processing device a change in position of the discrete point that occurred between the reference position and the current position during an amount of elapsed time occurring between the reference time and the current time;
repeating the receiving, using, and comparing steps at discrete intervals of time, so as to repeatedly track motion of the discrete point on the elevator rope over a period of time within the field of view of the imaging device in real-time;
determining a set of motion characteristics of the discrete point that define a real-time motion of the elevator rope, based upon the change of position and the amount of elapsed time; and
performing a motion countermeasure in the elevator rope based upon a determination that one or more motion characteristics in the determined set of motion characteristics exceeds a threshold value.

13. The method of claim 12 wherein the set of motion characteristics comprises rope acceleration, rope velocity, and rope frequency, the method further comprising determining rope sway based upon one or more of the set of motion characteristics.

14. The method of claim 12 wherein the motion countermeasure is performed when rope sway exceeds a rope sway threshold.

15. The method of claim 14, wherein the motion countermeasure comprises one or more of:
removing an elevator car from service, wherein the elevator car is attached to the elevator rope;
transmitting a notification to a remote device, the notification describing the motion characteristics; and
deploying a rope sway dampener device, wherein the rope sway dampener device is brought into contact with the elevator rope.

16. The method of claim 15, further comprising the step of, when a subsequent set of motion characteristics indicates that rope sway does not exceed the rope sway threshold, performing one or more of:
returning the elevator car to service;
transmitting a further notification to a remote device, the further notification describing the subsequent set of motion characteristics; and
withdrawing the rope sway dampener device.

17. The method of claim 12 wherein the elevator rope comprises a compensating rope.

18. The method of claim 12 wherein the elevator rope comprises a hoisting rope.

19. The method of claim 12, wherein the imaging device is a camera capable of capturing three dimensional depictions of objects within a field of view.

20. A system for detecting and reducing undesirable sway of an elevator rope in an elevator hoistway, comprising:
an elevator hoistway;
a first sheave disposed in the upper half of the elevator hoistway;
a second sheave disposed in the lower half of the elevator hoistway;
an elevator rope wrapped around the first sheave and the second sheave, the elevator rope comprising a first end and a second end, the first end attached to the top of an elevator car and the second end attached to the bottom of the elevator car;
a motor operable to move the elevator rope to raise or lower the elevator car within the elevator hoistway;
an imaging device disposed in the elevator hoistway such that an orientation of the elevator rope is tracked over a period of time within the field of view of the imaging device in real-time, the imaging device being configured to capture three dimensional depictions of objects within its field of view;
an image processing device in communication with the imaging device and configured to repeatedly:
receive a current set of imaging data from the imaging device, which current set of imaging data includes a current position of a discrete point on the elevator rope at a current time,
use a prior received set of imaging data from the imaging device as a reference set of imaging data, to determine a prior occurring reference position of the discrete point on the elevator rope at a prior occurring reference time,
compare the current set of imaging data to the prior-received set of imaging data to determine a change in position of the discrete point on the elevator rope between the reference position and the current position during an amount of elapsed time occurring between the reference time and the current time, so as to repeatedly track motion of the discrete point on the elevator rope in real-time, and
determine a real-time rope sway measurement of the elevator rope, based upon the change of position and the amount of elapsed time; and a controller in communication with the image processing device, the controller configured to operate the motor and to transmit a notification describing the rope sway measurement to a remote device in response to the rope sway measurement exceeding a predefined threshold.

* * * * *